United States Patent

Godeau et al.

[11] Patent Number: 6,012,743
[45] Date of Patent: Jan. 11, 2000

[54] QUICK CONNECTION DEVICE FOR FLUID CONDUIT UNDER PRESSURE

[75] Inventors: Denis Godeau, Vieilles Maisons/Joudry; Philippe Exandier, Chalette, both of France

[73] Assignee: Hutchinson, Paris, France

[21] Appl. No.: 09/000,152

[22] PCT Filed: Jun. 10, 1997

[86] PCT No.: PCT/FR97/01025

§ 371 Date: Jan. 28, 1998

§ 102(e) Date: Jan. 28, 1998

[87] PCT Pub. No.: WO97/47908

PCT Pub. Date: Dec. 18, 1997

[30] Foreign Application Priority Data

Jun. 10, 1996 [FR] France .................................. 96 07149

[51] Int. Cl.[7] .................................................. F16L 13/02
[52] U.S. Cl. ................................ 285/286.2; 285/294.3; 285/369; 285/382; 285/382.2
[58] Field of Search ................................ 285/369, 110, 285/382.2, 286.1, 294.1, 293.1, 286.2, 294.4, 296.1, FOR 168, FOR 169, FOR 171, 294.3, 382

[56] References Cited

U.S. PATENT DOCUMENTS

| | | |
|---|---|---|
| 1,184,066 | 5/1916 | Bowie ................................... 285/286.1 |
| 3,579,794 | 5/1971 | Powell . |
| 3,822,464 | 7/1974 | Hester et al. ..................... 285/294.1 X |
| 4,174,124 | 11/1979 | Dockree ........................... 285/286.1 X |
| 4,196,923 | 4/1980 | Zimmerli .............................. 285/286.1 |
| 4,552,384 | 11/1985 | Cyriax .............................. 285/293.1 X |
| 4,664,421 | 5/1987 | Jones .................................... 285/110 X |
| 5,106,127 | 4/1992 | Briet ..................................... 285/110 X |
| 5,492,376 | 2/1996 | Usui et al. . |

FOREIGN PATENT DOCUMENTS

| | | |
|---|---|---|
| 217685 | 4/1957 | Australia ....................... 285/FOR 168 |
| 226743 | 7/1987 | European Pat. Off. . |
| 2615266 | 11/1988 | France . |
| 2700195 | 7/1994 | France . |
| 1918597 | 10/1969 | Germany ........................... 285/382.2 |
| 1809491 | 5/1970 | Germany ........................... 285/382.2 |
| 7407979 | 11/1975 | Germany ..................... 285/FOR 168 |
| 38 078 383 | 9/1989 | Germany . |
| 43 29 442 | 3/1995 | Germany . |
| 947586 | 1/1964 | United Kingdom . |

*Primary Examiner*—Dave W. Arola
*Attorney, Agent, or Firm*—Alston & Bird LLP

[57] ABSTRACT

A quick-coupling device for a duct for fluid under pressure, in particular for a motor vehicle, the device comprising a metal sleeve (10) having a first end which includes an overmolded sealing lining (18) and is engaged on an enlarged end (24) of the duct (12), and having a second end which includes an overmolded sealing lining (16) for mounting in sealed manner on the end of an endpiece (32) of a circuit for fluid under pressure. The invention is particularly applicable to motor vehicle circuits for air-conditioning, braking, and power-assisted steering.

11 Claims, 1 Drawing Sheet

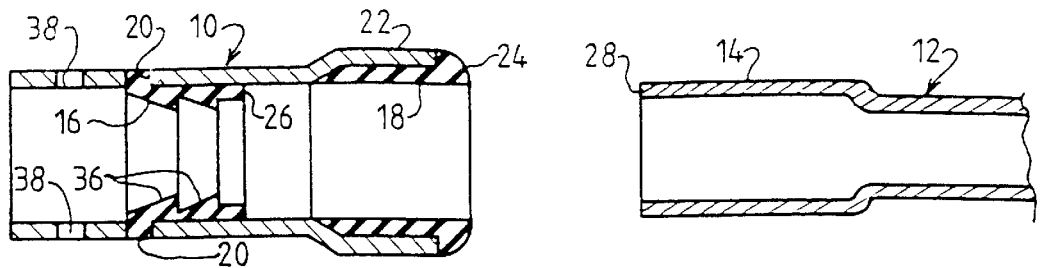
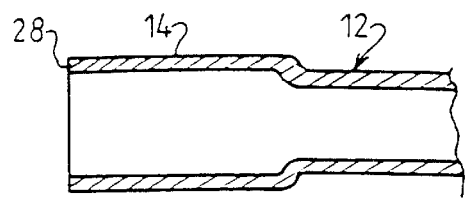
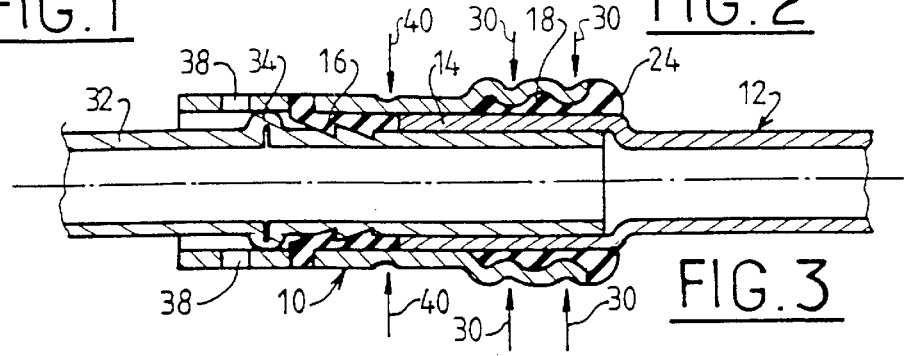
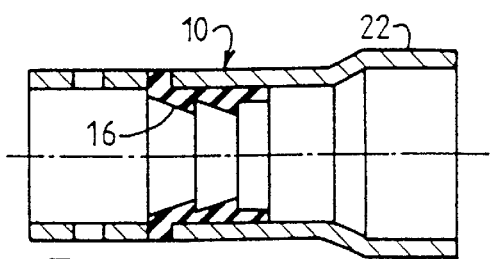
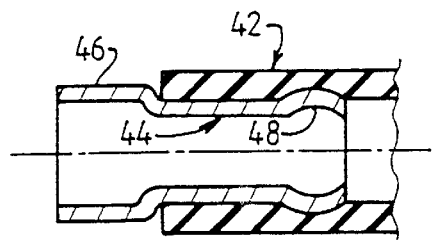
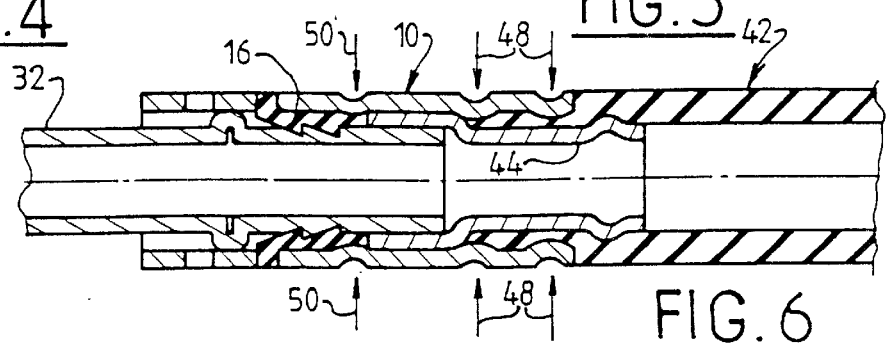
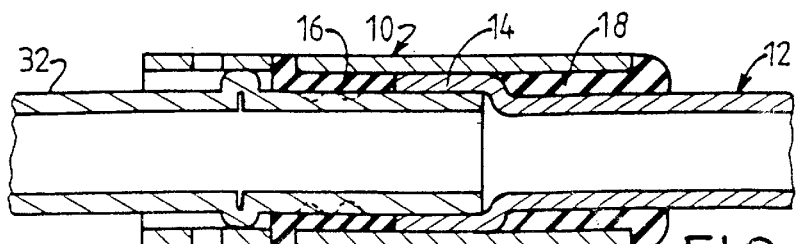

QUICK CONNECTION DEVICE FOR FLUID CONDUIT UNDER PRESSURE

The invention relates to a quick-coupling device for a duct for fluid under pressure, in particular for a motor vehicle, and more particularly it relates to a quick-coupling device for a duct in a fuel circuit or in a circuit for fluid under high pressure such as a power-assisted steering circuit, a braking circuit, or an air-conditioning circuit.

A quick-coupling device is already known, e.g. from patent application EP-0 606 028, for a fluid circuit that is under relatively low pressure, such as an engine cooling circuit, for example. That known device essentially comprises a sleeve of plastics material fixed on the end of a flexible duct of rubber or of elastomer via an overmolded gasket of elastically-deformable material such as rubber or an elastomer. That type of coupling provides excellent results for a fluid under relatively low pressure, however it cannot provide satisfactory sealing if it is used in a circuit for fluid under high pressure.

In conventional manner, quick-coupling devices for high-pressure fluid ducts are fitted with a plurality of add-on O-ring gaskets, with the main drawbacks being that they do not always provide good sealing, they require a considerable amount of force to be used on assembly, and they are sensitive to creep phenomena under the effects of the pressure and the temperature of the fluid, to the detriment of sealing.

A particular aim of the present invention is to provide a simple and effective solution to the problem of quick-coupling devices for high pressure fluid circuits.

To this end, the invention provides a quick-coupling device for a duct for fluid under pressure, in particular for a motor vehicle, the device comprising a rigid sleeve having a first end fixed in sealed manner on said duct and having a second end for coupling in sealed manner to a tubular endpiece connected to a circuit for fluid under pressure, the device being characterized in that sealing between the sleeve and the endpiece is provided by a lining of elastically-deformable material, such as rubber or an elastomer, overmolded on the second end of the sleeve, with sealing between the sleeve and the duct being provided by compressing another elastically-deformable material at the first end of the sleeve, the ends of the duct and of the endpiece being engaged and guided one within the other when the sleeve is coupled to the endpiece.

The sealing lining overmolded at the second end of the sleeve offers several major advantages over traditional series of O-rings:

the contact area between the endpiece and the sealing lining carried by the sleeve is much larger, thereby considerably improving the quality of sealing;

the force required to mount the endpiece inside the lining is smaller; and the overmolded lining is insensitive to creep phenomena under the effects of the pressure and the temperature of the fluid.

According to another characteristic of the invention, the end of the duct is enlarged to receive the end of the endpiece and is engaged with very little or substantially no clearance inside the sleeve by coming into abutment against said sealing lining.

Advantageously, the first end of the sleeve is crimped or swaged on the duct.

In a first embodiment of the invention, the above-mentioned duct is rigid, and sealing with the first end of the sleeve is ensured by a layer of elastically-deformable material overmolded on the sleeve before it is mounted on the duct.

In another embodiment of the invention, the above-mentioned duct is a flexible hose of elastically-deformable material such as rubber or an elastomer, and its end is threaded over a rigid tube engaged in the above-mentioned sleeve, and provides sealing with the first end of the sleeve.

In a third embodiment of the invention, the above-mentioned duct is rigid, and after the sleeve has been placed on the end of the duct, sealing with the sleeve is ensured by overmolding at least one elastically-deformable material between the first end of the sleeve and the duct.

Advantageously, the sealing material between the first end of the sleeve and the duct, and the sealing material between the second end of the sleeve and the endpiece are different from each other.

It is thus possible to make savings, with one of the sealing materials being highly effective against the fluid under pressure but relatively expensive, while the other sealing material is less effective, but is cheaper and serves to provide no more than "emergency" sealing.

The invention will be better understood and other characteristics, details, and advantages thereof will appear more clearly on reading the following description, made by way of example and with reference to the accompanying drawing, in which:

FIGS. 1 and 2 are diagrammatic axial section views of a sleeve and the end of a duct for fluid under pressure;

FIG. 3 is a diagrammatic axial section view showing the sleeve mounted on the duct and engaged on a tubular endpiece of a circuit for fluid under pressure;

FIGS. 4, 5, and 6 are views corresponding respectively to FIGS. 1, 2, and 3, but showing another embodiments of the invention; and FIG. 7 is a diagrammatic axial section view of yet another embodiment of the invention.

Reference is made initially to FIGS. 1 and 2 which are diagrammatic axial sections of a sleeve 10 forming a portion of a quick-coupling device of the invention, and the end of a duct 12 for fluid under pressure.

The sleeve 10 is made of a rigid material that is relatively undeformable, e.g. a metal or an appropriate plastics material.

The duct 12 for fluid under pressure is likewise made of a material that is rigid and relatively undeformable, e.g. a metal or an appropriate plastics material, and it includes an enlarged cylindrical end 14 designed to be engaged in the sleeve 10.

The sleeve 10 is provided with two sealing linings 16 and 18, one of which, 16, is overmolded on the inside face of the sleeve 10 at a certain distance from its ends, e.g. by being injected into the inside of the sleeve via holes 20 therethrough, while the other sealing lining 18 is overmolded on the inside face at an enlarged end 22 of the sleeve 10 and it projects slightly beyond said end to form an annular rim 24.

The inside diameter of the sealing lining 18 corresponds substantially to the outside diameter of the enlarged end 14 of the duct 12 and to the inside diameter of the remainder of the sleeve 10. At its end directed towards the lining 18, the other sealing lining 16 forms an abutment 26 projecting from the inside surface of the sleeve 10, against which the front face 28 of the enlarged end 14 of the duct 12 can come into engagement.

The device of the invention can be mounted very simply:

The sleeve 10 is engaged via its end 22 on the enlarged end 14 of the duct 12 until the end 26 of the lining 16 comes into abutment against the end front face 28 of the duct 12, the linings 16 and 18 being spaced apart from each other so that a middle portion of the sleeve 10 provides guidance to the enlarged end 14 of the duct 12.

The sleeve 10 can be fixed on the duct 12 by crimping or swaging its enlarged end 22, as shown diagrammatically by arrows 30 in FIG. 3. Optionally, the outside surface of the enlarged end 14 of the duct 12 may receive a layer of an adhesive substance, thereby providing a good bond with the rubber or the elastomer of the sealing lining 18 of the sleeve 10.

The duct 12 provided with the sleeve 10 can then be coupled to a tubular endpiece 32 of a high pressure fluid circuit (in particular at a pressure greater than or equal to 20 bars), said endpiece 32 being made of metal, for example, and including a collar 34 in the vicinity of its free end, said collar 34 having an outside diameter that corresponds substantially to the inside diameter of the free end of the sleeve 10, while the outside diameter of the endpiece 32 corresponds substantially to the inside diameter of the enlarged end 14 of the duct 12.

In this way, the free end of the endpiece 32 can be engaged over a certain length inside the enlarged end 14 of the duct 12 with clearance that is very small or substantially zero, a first level of sealing being provided by the lining 16 pressed against the outside surface of the endpiece 32, while a second level of sealing is provided by the lining 18 between the sleeve 10 and the enlarged end 14 of the duct 12.

As shown diagrammatically in FIG. 1, the inside surface of the lining 16 can be formed with projecting annular ribs 36 forming successive lines of sealing on the outside surface of the endpiece 32.

The link between the sleeve 10 and the endpiece 32 can be provided by means of a resilient U-shaped clip or the like, not shown, of a type that is well known in the art, which engages in slots 38 of the sleeve 10 along the collar 34 of the endpiece 32 which is thus held captive inside the sleeve 10.

Crimping or swaging may also be performed on the sleeve 10 as indicated by arrows 40, over the sealing lining 16, so as to provide better sealing between the endpiece 32 and the sleeve 10.

In this device of the invention, the sealing lining 16 may be made of a substance such as that sold under the name "VITTON", or of a halogenated nitrile rubber, i.e. a material that withstands high pressure and temperature of the fluid well, even when the fluid is chemically aggressive as is the case for a coolant, while the material of the other sealing lining can be less expensive, e.g. being of the EPDM type, or the like.

In the variant embodiment shown diagrammatically in FIGS. 4 to 6, the sleeve 10 has only one sealing lining 16 overmolded in the vicinity of its end co-operating with the endpiece 32, its enlarged end 22 having no such lining, and the fluid duct 42 is a flexible hose based on an elastically-deformable material such as rubber or an elastomer, with the end thereof being engaged on a rigid tube 44 of metal or suitable plastics material, formed with an enlarged end 46 whose outside diameter corresponds substantially to the inside diameter of the enlarged end 22 of the sleeve 10, and whose inside diameter corresponds substantially to that of the sealing lining 16.

The opposite end 48 of the tube 44 situated inside the hose 42 may be expanded radially outwards to participate in fixing the hose 42 on the tube 44.

During assembly, and as in the preceding embodiment, the enlarged end 22 of the sleeve 10 is engaged on the enlarged end 46 of the tube 44 and is crimped onto said tube as indicated at 48, the hose 42 acting as a sealing lining between the end 22 of the sleeve 10 and the tube 44.

The front face of the enlarged end 46 of the tube 44 is in abutment against the sealing lining 16 of the sleeve 10, the tubular endpiece 32 of the fluid circuit is engaged inside the sleeve 10 and the enlarged end 46 of the tube 44, as in the preceding embodiment, and the sleeve 10 may be crimped, as indicated at 50, level with the sealing lining 16 in order to improve sealing with the tubular endpiece 32.

In the variant embodiment of FIG. 7, the sleeve 10 is entirely cylindrical and has constant inside diameter over its entire length, corresponding to the outside diameter of the enlarged end 14 of the fluid duct 12 which is identical to that shown in FIG. 2.

During assembly, the sleeve 10 is engaged on the enlarged end 14 of the duct 12 so as to extend both ways from said enlarged end 14, and then the assembly is placed in a mold and the sealing linings 16 and 18 analogous to those shown in FIG. 1 are formed by injecting one or two sealing materials, firstly into the inside of the sleeve 10 up to the front face of the enlarged end 14 of the duct 12, and secondly between the end of the sleeve 10 and the outside face of the duct 12.

In this case, it is the sealing linings 16 and 18 which serve to fix the sleeve 10 to the duct 12.

The device obtained in this way is used like that of FIGS. 1 and 2, the free end of the tubular endpiece 32 of the fluid circuit being engaged inside the sleeve 10 and the sealing lining 16 and also inside the enlarged end 14 of the duct 12.

The devices described above are characterized by relatively small forces required for assembly on the endpieces 32 due to using sealing linings that are overmolded instead of using O-rings. In addition, and as can clearly be seen in FIGS. 3, 6, and 7, the sealing linings 16 are protected against creep phenomena resulting from the pressure and the temperature of the fluid. The sealing linings 16 and 18 provide two levels of sealing, over areas that are much larger than those of O-rings, such that excellent sealing is provided against fluids under high pressure.

In a variant, the sealing linings 16 and/or 18 may be overmolded on the outside surface of the sleeve 10. For example, the sleeve 10 of FIG. 7 may include two sealing linings 16 and 18 overmolding on its outside surface and engaged in the enlarged ends of the duct 12 and the endpiece 32, which then become female pieces.

We claim:

1. A quick-coupling device for a duct for fluid under pressure in a motor vehicle, the device comprising a rigid sleeve having a first end fixed in a sealed manner on said duct and having a second end for coupling in a sealed manner to a tubular endpiece connected to a circuit for fluid under pressure, a lining of elastically-deformable material molded on the second end of the sleeve for providing sealing between the sleeve and the endpiece, and another elastically-deformable material at the first end of the sleeve providing sealing between the sleeve and the duct, the ends of the duct and of the endpiece being engaged and guided one within the other when the sleeve is coupled to the endpiece.

2. A device according to claim 1, wherein said lining covers the inside surface of the second end of the sleeve and includes circular ribs on its inside surface for forming lines of sealing on the outside surface of the endpiece.

3. A device according to claim 1, wherein the end of the duct is enlarged to receive said endpiece with clearance that is small or substantially zero, and is engaged with clearance that is small or substantially zero inside the sleeve, coming into abutment against said sealing lining of the second end of the sleeve.

4. A device according to claim 1, wherein the first end of the sleeve is crimped or swaged in sealed manner on the duct.

5. A device according to claim 1, wherein the second end of the sleeve is crimped or swaged on said endpiece.

6. A device according to claim 1, wherein the duct is rigid, and sealing with the first end of the sleeve is provided by the layer of elastically-deformable material molded on the sleeve before it is mounted on the duct.

7. A device according to claim 6, wherein the layer of elastically-deformable material molded on the first end of the sleeve is bonded onto the duct.

8. A device according to claim 1, wherein said duct includes a rigid tube and a flexible hose based on an elastically-deformable material such as rubber or an elastomer, the end of which is engaged on the rigid tube and provides said sealing with the first end of the sleeve.

9. A device according to claim 1, wherein said duct is rigid and sealing with the sleeve is provided, after the sleeve has been placed on the end of the duct, by molding at least one said elastically-deformable material between the first end of the sleeve and the duct and over the inside surface of the second end of the sleeve.

10. A device according to claim 1, wherein the sealing material between the first end of the sleeve and the duct, and the sealing material between the second end of the sleeve and the endpiece are materials that are different from each other.

11. A device according to claim 1, wherein the lining of the second end of the sleeve includes a plurality of annular ribs designed to form successive lines of sealing on said endpiece.

* * * * *

UNITED STATES PATENT AND TRADEMARK OFFICE
CERTIFICATE OF CORRECTION

PATENT NO. : 6,012,743
DATED : January 11, 2000
INVENTOR(S) : Godeau et al.

It is certified that error appears in the above-identified patent and that said Letters Patent is hereby corrected as shown below:

Title page, [56] References Cited, FOREIGN PATENT DOCUMENTS, line 8, "38 078 383" should read --38 08 383--.

Column 4, line 61, cancel "small or"; line 62, cancel "small or".

Signed and Sealed this

Seventeenth Day of October, 2000

Attest:

Q. TODD DICKINSON

*Attesting Officer*      *Director of Patents and Trademarks*